United States Patent Office 2,991,172
Patented July 4, 1961

2,991,172
REDUCTION OF IRON ORES CONTAINING FERRUGINOUS CLAYS
George Hahn and Syed Ishtiaq Ali, both of Central Laboratories, Pakistan Council of Scientific and Industrial Research, Karachi, Pakistan
No Drawing. Filed Oct. 26, 1959, Ser. No. 848,532
7 Claims. (Cl. 75—26)

This invention relates to a process for obtaining metallic iron from low grade iron ore containing ferruginous clay.

One of the basic raw materials in any industrial economy is, of course, iron and many countries are indeed fortunate in having large bodies of comparatively rich ore. It is to be emphasized, however, that one day in the near future high grade ore will be generally in short supply, and that even during the present time, many countries do not have such rich ore readily available. Instead of high grade ore, many areas of the earth's crust do contain an abundance of iron in the form of ferruginous, aluminum silicate-containing clays. Unfortunately, though, prior methods for beneficiating these clays have been economically impractical.

The basic problem inherent in these prior beneficiating techniques was the simple fact that much of the iron oxide in the clay could not be reduced to elemental iron. Because of this difficulty, experimental processes conducted with conventional solid reducing agents, such as coke, always resulted in a comparatively pessimistic outlook for the large scale utilization of the ores.

The object of applicants' invention, therefore, is to provide an economical process for the beneficiation of ores having ferruginous clays.

Other objects and advantages of this invention will be evident on further study of the specification and the appended claims.

In brief, the objects of this invention are attained by first roasting these ores in an excess of an oxygen containing atmosphere at a sufficiently high temperature, and then reducing the roasted ore with a gaseous reducing agent such as natural gas, methane, hydrogen, carbon monoxide, and others. It is advantageous and therefore preferred that the reducing step or the roasting step be accomplished in a fluidized bed of ore particles. To utilize the process equipment to its fullest extent, it is even more preferable that both steps be fluidized.

It is to be appreciated that the use of gaseous reducing agents has been tried with comparatively rich ores. For example, oxidic iron ores were reduced with hydrogen during World War II for the production of sponge iron to be used as a catalyst for the Fischer-Tropsch synthesis. This process, modified by the utilization of a fluidized bed, was later used in the United States for processing iron ore on a pilot plant scale of 20 tons daily production. In Russia the same process was carried out using carbon monoxide as the reducing agent and in Chicago the United States Steel Co. utilized mixtures of carbon monoxide and hydrogen. Finally, Arthur D. Little, Inc., Cambridge, Massachusetts, combined the partial oxidation of natural gas with the reduction of oxidic iron ores in a fluidized bed.

It is to be noted that, though these processes are competing favourably with the conventional blast furnace as far as rich oxidic iron ores are concerned, they have not been applied successfully to the low grade ferruginous clay containing ores.

Experiments with ores such as the Pakistani Kalabagh ore, the German Brauneisensteine from Oberhessen and the Dogger ore from Baden-Wurttemberg showed that they would not in fact respond to a simple gaseous reduction treatment. The analysis of the above-mentioned two German ores is as follows:

| Type Ore | Fe | Mn | P | $SiO_2$ | $Al_2O_3$ | CaO | MgO | Moisture | lost on ignition |
|---|---|---|---|---|---|---|---|---|---|
| Brauneisensteine (Oberhessen) | 25–30 | 0.2–0.8 | 0.2–0.31 | 20–25 | 10–16 | 0.3–0.1 | 0.2–0.6 | 6–10 | 5–15 |
| Dogger Ore (Badische-Wurttembergisch) | 22–34 | 0.2–0.4 | 0.1–0.4 | 20–28 | 6–11 | 2–12 | 1–2 | 10–22 | 8–12 |

(Reference: Ullmanns Encyclopedia der Technischen Chemie) 6 Band, page 294.

When for example, the low grade Kalabagh iron ore which contains 34% iron as an average, is treated with the natural gas obtained from the Sui gas fields of West Pakistan at temperatures ranging from 600° C. up to 1200° C., and then magnetically separated, it yields only 53% of the whole iron content as metallic iron. The weight percent composition of the Kalabagh iron ore with respect to its iron bearing minerals is as follows:

Percent
Limonite, $Fe_2O_3.H_2O$ _____ 7
Hematite, $Fe_2O_3$ _____ 14
Siderite, $FeCO_3$ _____ 22
Chamosite, $3(Fe, Mg)O_2Al_3O.2SiO_2 nH_2O$ _____ 30

The recovery of 53% iron after magnetic separation corresponds exactly to the amount of iron present in the first three minerals, namely, the oxides and the carbonate taking into account the loss of water, oxygen and carbon dioxide. The iron combined with alumina-silicate in the chamosite remains unaffected.

It is a highly important aspect of this invention that it was unexpectedly discovered that the refractory chamosite complex of iron aluminum silicate could be decomposed by roasting it in air at temperatures sufficiently high to convert it into iron compounds susceptible to reduction. The temperature of roasting is critical as it was found that even as high as 800° C., the magnetic portion of the treated ore still yielded a product with no more than a 60.70% iron content, and the X-ray pattern still showed the characteristic lines of chamosite.

Only at roasting temperatures ranging from 900 to 1000° C., could the whole ore be transformed into reducible iron compounds. On treating such a roasted ore with natural gas at temperatures between 900° C. and 1000° C., a vigorous reaction takes place whereby the whole iron ore is reduced to sponge iron. On subsequent magnetic separation of the ore thus treated, a magnetic portion is obtained which has a 93% iron content, as determined by chemical and confirmed by X-ray analysis.

With this method of processing it has become possible to reduce low grade, ferruginous clay containing ores to metallic iron and thus industrially utilize not only the Pakistani Kalabagh iron ore, which was considered to be unfit for the production of metallic iron (cf. Skelton and Heginbotham, "Preliminary Beneficiation Tests of Pakistan Iron Ore," July 1958, U.S. Bureau of Mines, Washington, D.C.), and the economic metallurgical use of which by any other known process was also a subject of intractable controversy, but also all the other low grade ferruginous clay containing ores occurring all over the world, for example, the German Brauneisensteine from Oberhessen and the Dogger ores from Baden-Wurttemberg.

The biggest economic advantage of this invention is that the entire process is carried out at around 1000° C., whereas in the blast furnace as well as in the Krupp Renn process, temperatures of the order of 1400° C. are needed.

The following examples are intended to be useful specific embodiments, but are not intended to be limitative of the appended claims.

Example 1

100 g. of Pakistani powdered iron ore from Kalabagh, particle size 0.5 cm., was heated in an electric oven up to 950° C. for 3 hours in a stream of air. The flow of air is replaced by a stream of Sui gas at the same temperature, and then a vigorous reaction takes place during which lumps of sponge iron are formed. These lumps are powderable between the fingers and yield a material containing 93% iron after magnetic separation.

Example 2

100 g. of the Pakistani ore from Kalabagh after being roasted at 950° C. in an excess of air for 3 hours was whirled up with a current of a mixture of 85% hydrogen with 15% carbon monoxide at a temperature of 950° C. The outcoming gas was freed from moisture and recycled. After this treatment the material is cooled down in the reducing atmosphere and then subjected to magnetic separation. The magnetic portion contained 93% iron. (Yield 90–95% of theory.)

Example 3

100 g. of the German Brauneisensteine from Oberhessen, particle size 0.5 cm., was heated in a current of air at 950° C. for two hours. After that natural gas was passed through at the same temperature. Here also an energetic reaction took place and the reduction was completed in short time. Magnetically separated the treated ore yielded more than 90% of the present iron as a 93% iron containing magnetic fraction.

Example 4

100 g. of the German Dogger ore from Baden-Wurttemberg, particle size 0.5 cm., was roasted in an excess of air for one hour at 950° C. and subsequently heated with natural gas at the same temperature. After half hour treatment the ore was cooled down in an atmosphere of the natural gas, powdered and magnetically separated. Yield: over 95% of the iron present in the ore as a material of 93% iron content.

In addition to the above ores, this invention can be utilized with all other iron ores containing ferruginous clays. Particularly it is useful for all iron ores containing chlorites and more particularly to ores containing thuringite forms of ferruginous clays of which chamosite and vavolite are members.

It is to be realized of course, that this invention is more applicable to those ores containing a significant percentage, e.g., over about 5%, of ferruginous clays. It is obvious, though, that in steel production a 1% increase in yield is important, and therefore those ores having a ferruginous clay content of even less than 5% can be benefited by this process. The most efficient utilization of this invention, however, is in connection with those ores having a relatively high percentage of ferruginous clays such ores being shown in the examples.

Many modifications can be made to this invention in order to bring about thermal and raw material efficiencies, For example, the roasted ore can be used as a preheating medium for the reducing gas. In addition, after the reducing gas is used, it can be dried, then recycled to use any unreacted components. It is also preferable for the sake of economics that this operation be carried out continuously.

It will be understood that this invention is susceptible to other modifications in order to adapt it to the different usages and conditions, and, accordingly it is desired to comprehend such modifications within the invention as may fall within the scope of the appended claims.

What is claimed is:

1. A process for the production of metallic iron from ores containing at least about 5% of ferruginous aluminum silicate chloritic clay, said clay characterized by being difficultly reducible in its natural state to elemental iron, which process comprises the steps of roasting said ore in an excess of an oxygen-containing gas at 900–1000° C., whereby the chloritic clay is decomposed into iron compounds susceptible to reduction, and then subjecting said roasted ore in the fluidized state to an atmosphere containing reducing gases, whereby the iron in the ore is substantially reduced to elemental iron.

2. The process described in claim 1, wherein the reducing gas is selected from the group consisting of natural gas, hydrogen, carbon monoxide and mixtures thereof.

3. The process described in claim 1 wherein the roasting is accomplished in a fluidized bed.

4. The process described in claim 1, wherein the roasting and reducing is accomplished in a fluidized bed.

5. The process described in claim 1, characterized by contacting the hot roasted ore with the reducing gas before the reducing gas is reacted, thereby effectively utilizing the roasted ore as a preheating medium for the reducing gas.

6. The process described in claim 1, characterized by magnetically separating the metallic elemental iron from the final reduced gangue.

7. The process described in claim 1, wherein the low grade iron ore contains about 30% of ferruginous clay.

References Cited in the file of this patent

UNITED STATES PATENTS

| | | |
|---|---|---|
| 1,979,729 | Brown | Nov. 6, 1934 |
| 2,282,124 | Fahrenwald et al. | May 5, 1942 |
| 2,445,648 | Truesdale | July 20, 1948 |
| 2,547,685 | Brassert et al. | Apr. 3, 1951 |

OTHER REFERENCES

The Making, Shaping and Treating of Steel, 7th edition, page 140. United States Steel Corp., Pittsburgh, Pa.